(12) United States Patent
Picard et al.

(10) Patent No.: US 10,068,125 B2
(45) Date of Patent: Sep. 4, 2018

(54) METHOD FOR VALIDATING THE AUTHENTICITY OF AN ELEMENT OF THE HUMAN BODY

(71) Applicant: Safran Identity & Security, Issy-les-Moulineaux (FR)

(72) Inventors: Sylvaine Picard, Puteaux (FR); William Ketchantang, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 15/315,511

(22) PCT Filed: Jun. 2, 2015

(86) PCT No.: PCT/EP2015/062195
§ 371 (c)(1),
(2) Date: Dec. 1, 2016

(87) PCT Pub. No.: WO2015/185522
PCT Pub. Date: Dec. 10, 2015

(65) Prior Publication Data
US 2017/0206397 A1    Jul. 20, 2017

(30) Foreign Application Priority Data
Jun. 2, 2014  (FR) ...................................... 14 54984

(51) Int. Cl.
*G06K 9/00* (2006.01)
(52) U.S. Cl.
CPC .................................. *G06K 9/0012* (2013.01)
(58) Field of Classification Search
CPC ..... G06F 21/32; G06F 21/577; G06K 9/0012; G06K 9/2018
See application file for complete search history.

(56) References Cited

U.S. PATENT DOCUMENTS 6,292,576 B1  9/2001  Brownlee
6,327,376 B1  12/2001  Harkin
(Continued)

FOREIGN PATENT DOCUMENTS

EP    2 192 526 A2    6/2010
EP    2 328 111 A1    6/2011
(Continued)

OTHER PUBLICATIONS

International Search Report and Written Opinion in PCT/EP2015/062195 dated Aug. 28, 2015, with English translation.
(Continued)

*Primary Examiner* — Ali Bayat
(74) *Attorney, Agent, or Firm* — Womble Bond Dickinson (US) LLP (57) ABSTRACT

The invention relates to a device and to a method for validating whether an object is an element (5) of the human body, comprising at least the following steps: illuminating with at least one first light source (1) and with at least one second light source (2) an object that it is desired to validate is or is not a human body element; acquiring an image with an image sensor (3), the pixels of said image being associated with at least two characteristic values of a first color component and of a second color component, respectively; implementing validating processing dependant on comparisons between the values of the second component of the pixels in a zone of interest of the image and values of the first component of said pixels; validating or not the authenticity of the object (5) depending on the result of the validating processing.

14 Claims, 3 Drawing Sheets

(56) References Cited

U.S. PATENT DOCUMENTS

| | | | |
|---|---|---|---|
| 8,270,681 B2* | 9/2012 | Abe | A61B 5/0059 |
| | | | 382/115 |
| 8,275,174 B2* | 9/2012 | Abe | A61B 5/0059 |
| | | | 382/115 |
| 8,508,337 B2* | 8/2013 | Thiebot | G06K 9/2018 |
| | | | 340/5.52 |
| 9,836,591 B2* | 12/2017 | John Archibald | G06F 21/32 |
| 2005/0205667 A1* | 9/2005 | Rowe | A61B 5/1171 |
| | | | 235/382 |
| 2008/0025579 A1 | 1/2008 | Sidlauskas et al. | |
| 2010/0148068 A1 | 6/2010 | Schwaneberg et al. | |

FOREIGN PATENT DOCUMENTS

| | | |
|---|---|---|
| JP | 2001 510579 A | 7/2001 |
| WO | WO 2011/047235 A1 | 4/2011 |

OTHER PUBLICATIONS

Search Report and Written Opinion in French Application No. 1454984 dated Mar. 10, 2015, with English translation coversheet.

\* cited by examiner

METHOD FOR VALIDATING THE AUTHENTICITY OF AN ELEMENT OF THE HUMAN BODY

The present invention relates to a method for validation of whether an object is an element of the human body and to a validation device configured to execute such a method and a method for calibrating such a validation device.

Authentication by fingerprints or by the venous network is one of the techniques used for biometric authentication. An image of an illuminated finger is acquired and analysed to identify an individual. But, it is possible to use decoys, false fingers reproducing the characteristics on the base of which analysis of the image relies, such as for example fingerprints or the venous network of the finger.

In the case of identification based on recognition of the venous network, the acquisition of images of veins in a finger is done by means of infrared lighting and a camera sensitive to infrared. In fact, the veins of the finger absorb more infrared lighting than other subcutaneous tissue. In this case, a decoy presented to the vein acquisition sensor to fool the acquisition device needs only present the appropriate infrared absorption properties.

It is therefore necessary to also provide a validation method to validate whether the object analyzed is actually an element of the human body, most often a finger, but it can be an entire hand or another part of the body.

Different validation methods have been proposed, in general employing various properties of a living finger more or less difficult to reproduce. Of these solutions, some try to reveal the appearance and the disappearance of venous networks as a function of the pressure exerted by the finger. For example, application US2011/0129128 A1 describes the use of pressure sensors used for detecting a disappearance of vein after having strong pressure.

Other solutions try to locate the veins by an interferometric system. For example, application EP 2328111 A1 uses an optical interferometry system for analysing the incident light wave and the wave diffused by the subcutaneous tissue to deduce therefrom the depth of veins and the difference in frequency between the two waves characteristic of the cutaneous environment.

But, apart from the variable effectiveness of these methods, they generally need complex, costly and bulky devices. Also, they sometimes need specific use, such as for example certain pressure of the finger, and the quality of authentication also depends on the behavior of the user. Finally, these solutions are often difficult to put in place in existing systems.

Documents such as application US 2005/205667 A1 provide, for each of a plurality of wavelengths, illuminating the skin of a finger and acquiring an image of the finger lit at this wavelength. The images acquired in this way are individually compared to expected characteristics of an authentic finger for this wavelength. The use of several images each with lighting at a particular wavelength reveals characteristics of the behavior of an authentic finger specific to each wavelength. This determines a spectral profile and compares it to the expected spectral profile for an authentic finger. The behavior of an authentic finger can vary as a function of the finger (fine or thick skin, etc.), and conditions of acquisition of the images (dry or moist skin, cleanliness, etc.). The result is that the margin of tolerance on the differences relative to the expected behavior must be considerable, reducing the effectiveness of fraud detection.

PRESENTATION OF THE INVENTION

The invention aims at rectifying at least partly these disadvantages and preferably all of them, and focuses especially on proposing a validation method without disadvantages for the user, simple to perform and needing no complex device.

For this purpose, a method is proposed for validation of whether an object is an element of the human body comprising at least the following steps:
  illumination by at least one first light source and by at least one second light source of an object whereof the aim is to validate that it corresponds to an element of the human body, said second light source emitting light at wavelengths inferior to those of the first source;
  acquisition of an image by an image sensor, the pixels of said image being associated with at least two characteristic values respectively of a first color component and of a second color component, said second component corresponding to at least one wavelength of the second source, the respective light powers of illumination of the first light source and of the second light source being previously calibrated so that the first color component and the second color component are statistically balanced for an authentic element of the human body;
  execution of a validation processing as a function of comparisons between the values of the second component of the pixels of an area of interest of the image and the values of the first component of said pixels;
  validation or not of the authenticity of the object as a function of the result of the validation processing.

The method is advantageously completed by the following characteristics, taken singly or in any one of their technically possible combinations:
  the first light source is configured so that the light emitted by said first light source is incident to the object outside the field of acquisition of the image sensor, and the second light source is configured so that the light emitted by the latter is incident to the object in the field of acquisition of the image sensor;
  a first polarizer is disposed on the light path between the first light source and the object, said first polarizer being a linear polarizer with a polarization axis in a first direction, and a second polarizer is disposed at the image sensor, said second polarizer being a linear polarizer with a polarization axis in a second direction orthogonal to the first direction, the first light source illuminating the object by polarized light in the first direction and the second light source illuminating the object by non-polarized light in the first direction;
  the first light source emits light in the infrared so that light emitted by said first light source is mainly diffused in an authentic element of the human body, and the second light source emits light in the visible spectrum such that the light emitted by said second light source is mainly reflected by an authentic element of the human body;
  the first light source emits in wavelengths between 780 nm and 900 nm, and the second light source emits in wavelengths between 435 nm and 550 nm;
  the first light source emits light in the infrared, and the lighting of the object by the first light source is configured to make appear the venous network inside an authentic element of the human body in the image acquired by the image sensor;
  the first color component and the second color component are statistically balanced for an authentic element of the human body when the difference between the first color component and the second color component in an area of an image corresponding to said authentic element of the human body is less than a threshold;

the exposure time during which the object is illuminated is previously determined by a step during which the object is illuminated only by the first light source at a determined power, said exposure time corresponding to the time necessary so that the average level of exposure of the image sensor to light reaches a predetermined value;

the validation processing is also a function of the exposure time;

the power of the first light source is previously determined by a step during which the object is illuminated only by the first light source during a determined exposure time, said power corresponding to the power necessary so that the average level of exposure of the image sensor to light reaches a predetermined value;

the validation processing is also a function of the power of the first light source thus determined;

the validation processing comprises calculation of a reflection parameter which is a function of the sum of the values of the second component of the pixels of the area of interest whereof the first component is less by a predetermined value than the value of the second component;

the sum is weighted by the inverse of weights, functions of the predetermined spatial distribution of the light intensity of the second light source;

the reflection parameter β is determined according to the following formula:

$$\beta = \frac{1}{N_{ROI}} \sum_{x \in ROI} \frac{x_g \cdot H(x_g - (x_r + \varepsilon))}{\omega_x}$$

with H the Heaviside function, $N_{ROI}$ the total number of pixels x of the area of interest ROI, $x_r$ the value of the first component of the pixel x, $x_g$ the value of the second component of the pixel x, ε a threshold constant, and $\omega_x$ a predetermined weight, function of the light intensity of the second light source (2) for the pixel x.

The invention also relates to a computer program product comprising program code instructions for executing the steps of the method according to the invention when said program is executed by a computer.

The invention also relates to a validation device configured to execute a validation method according to the invention, said validation device comprising
at least one first light source configured to emit light in the direction of the object;
at least one second light source configured to emit light in the direction of the object at wavelengths inferior to those of the first source;
an image sensor sensitive to a range of wavelengths covering at least partly the first range of wavelengths and the second range of wavelengths, configured to acquire an image of the object whereof the pixels are associated with at least two characteristic values respectively of a first color component and of a second color component, said second component corresponding to at least one wavelength of the second light source,
a processing unit configured to execute a validation processing as a function of comparisons between the values of the second component of the pixels and the values of the first component in an area of interest of the image.

The invention also relates to a method for calibrating a validation device according to the invention, comprising at least the following steps, for each of the authentic elements of the human body of a learning base:
illumination of the authentic element of the human body by the first light source,
determination of an exposure time corresponding to the time necessary so that the average level of exposure to the light of the image sensor reaches a predetermined value, the light power of the first light source being selected to make appear the venous network inside the authentic element of the human body on an image acquired by the image sensor,
iteratively until and as long as the difference between the first color component and the second color component in an area of interest of the image corresponding to the authentic element of the human body is less than an equilibrium threshold:
simultaneous illumination of the element of the human body by the first light source and by the second light source during said exposure time,
acquisition of an image by the image sensor,
acquisition of an image by the image sensor,
increase in the power of the second light source,
the light power of the second light source being selected so as to be statically representative of the powers associated with each of the authentic elements of the human body of the learning base thus determined.

PRESENTATION OF THE FIGURES

The invention will be better understood from the following description which relates to embodiments and variants according to the present invention, given by way of non-limiting examples and explained with reference to the appended diagrammatic drawings, wherein.

DETAILED DESCRIPTION

In the following description, the element of the human body in question is a finger, and the object is therefore either an authentic finger or a fraud imitating a finger, which corresponds to a typical application of the invention.

Figure 1:
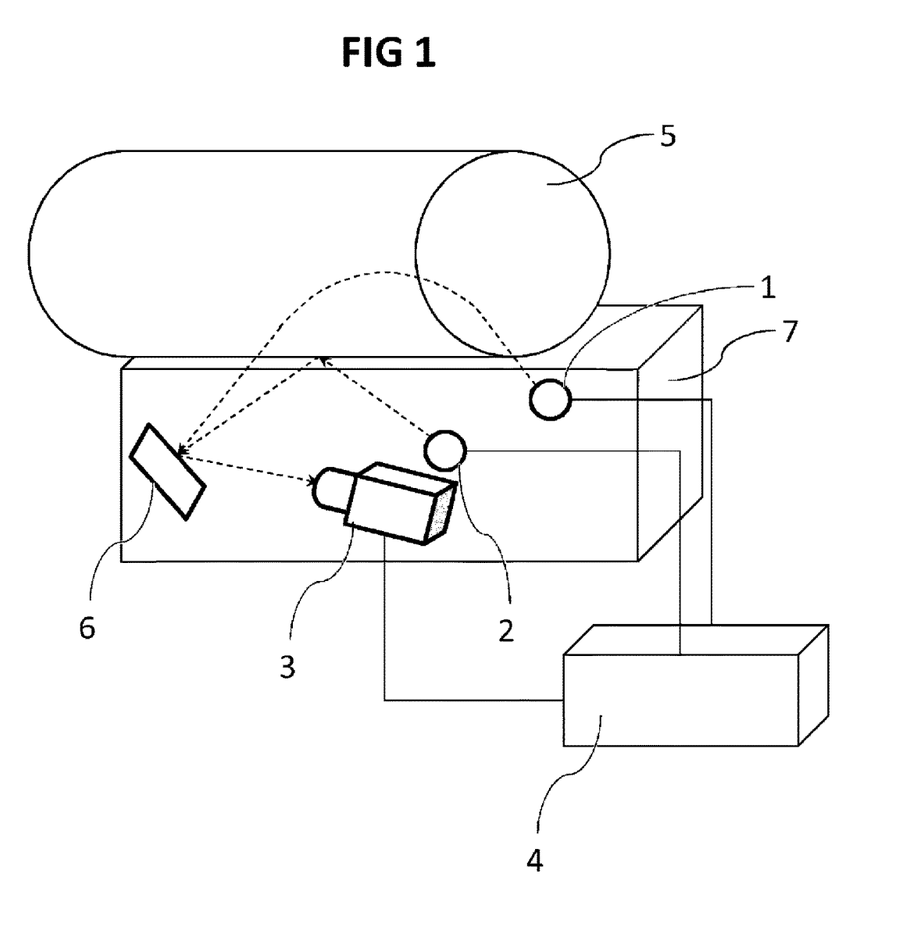
FIG. 1 is a diagram illustrating a validation device according to a possible embodiment of the invention.

In reference to FIG. 1, a validation device according to an embodiment of the invention comprises at least one first light source 1 emitting light in the direction of the finger 5 in a first range of wavelengths, and at least one second light source 2 emitting light in the direction of the finger 5 in a second range of wavelengths whereof the wavelengths are inferior to those of the first range. The second light source therefore emits light at wavelengths inferior to those of the first light source.

The first and the second light source 2 can comprise one or more light-emitting diodes or other source of light, and are combined by the wavelength of their lighting. In the illustrated example, a support 7, for example a prism, transparent, is used so that the finger rests above.

The first range of wavelengths is preferably in the infrared, while the second range of wavelengths corresponds to a visible spectrum. The first range of wavelengths corresponds preferably to close infrared, or 700 nm to 900 nm, while the second range of wavelengths can range from 400 nm to 700 nm. The first light source 1 emits light in the infrared so that the light emitted by said first light source 1 is mainly diffused in an authentic element of the human body. The second light source 2 emits light in the visible spectrum such that the light emitted by said second light source 2 is mainly reflected by an authentic element of the human body. Preferably, the wavelengths of the first light source 1 and those of the second light source 2 are spaced by at least 200 nm. For example, the first range of wavelengths is between 780 nm and 900 nm, and the second range of wavelengths is between 435 nm and 550 nm.

It is possible to provide a second light source 2, with wavelengths corresponding to a color other than the first second light source 2, but still in the visible spectrum. For example, it is possible to provide a second light source 2 emitting in the blue, i.e., between 435 and 500 nm, while another second light source 2 emits in the green, i.e., from 500 to 550 nm. The following description will be made in the case of a single second light source 2 emitting in the green for the sake of simplicity.

The validation device also comprises an image sensor 3 sensitive to a range of wavelengths covering at least partly the first range of wavelengths and the second range of wavelengths, configured to acquire an image of the object presented to the device, typically a finger. The image sensor 3 is a photographic sensor, a photosensitive electronic component serving to convert electromagnetic radiation into an analog electric signal. For example, it is a color CCD sensor or similar. A mirror 6 can be provided to send back light in the direction of the image sensor 3.

Such a color sensor records an image of the object with, for each pixel, values associated with color components. Typically, these color components are red, green and blue, giving the current appellation RGB. So, associated with each pixel x of the image are three values $(x_r, x_g, x_b)$ characteristic of the light intensity in the component, respectively red, green and blue.

A matrix of color filters commonly used is the Bayer filter, a matrix composed of filters of the colors red, green and blue, placed in front of the photographic sensor which records the light intensities behind each of the filters of the matrix, associating a value to a colored component. In the example of 24-bit images which will be used here, the three components are each coded on 8 bits and therefore their value extends from 0 to 255. Other formats can be used, both in color and in coding of values.

The first light source 1 is configured so that the light emitted by said first light source 1 and reaching the image sensor coming from 1 has sufficiently penetrated any finger 5 to contain a significant signal coming from the veins of said finger. In other terms, the lighting of the object by the first light source 1 is configured to make appear the venous network inside an authentic element of the human body in the image acquired by the image sensor 3.

For this purpose, the first light source 1 can be disposed so as not to light up the surface of the imaged object acquired by the image sensor 3. For example, when the image sensor 3 is located below the object, the first light source 1 lights the side or the top of the object. It is also possible that the first light source 1 lights the object of the same side as the imaged surface, but outside the field of acquisition of the image sensor 3. More generally, the first light source 1 is configured so that the light emitted by the latter is incident to the object outside the field of acquisition of the image sensor 3, i.e., the first light source 1 does not light the imaged surface of the object.

The second light source 2 is configured so that the light emitted by the latter is incident to the object in the field of acquisition of the image sensor 3, i.e., the second light source 2 lights up the imaged surface of the object which is acquired by the image sensor 3.

A first polarizer can also be used, disposed on the light path between the first light source 1 and the object, said first polarizer being a linear polarizer with a polarization axis in a first direction, and a second linear polarizer at the image sensor 3, with a polarization axis in a second direction orthogonal to the first direction. The light captured by the image sensor 3 is thus polarized by the second polarizer. The orthogonality of the directions of the polarization axes avoids that light emitted by the first light source 1 and reflected by the object without having been diffused in the latter to be captured by the image sensor 3. Inversely, there is no linear polarizer with a polarization axis in the first direction on the light path between the second light source 2 and the object: light emitted by the second light source 2 is not polarized in the first direction. There is preferably no polarizer on the light path between the second light source 2 and the object: the light emitted by the second light source 2 is not polarized.

The validation device comprises another processing unit 4 configured to execute a validation processing as a function of comparisons between the values of the second component of the pixels and the values of the first component of the pixels in an area of interest of the image, so as to validate that the object corresponds to an element of the human body, in this case the finger 5. This processing unit 4 is typically a computer fitted with a processor and a memory. Contrary to many materials, subcutaneous tissue of a finger have characteristics such that they diffuse infrared light more than they reflect light of an inferior wavelength, such as green or blue, contrary to many false fingers. It is therefore proposed to exploit this phenomenon to characterize the living fingers to distinguish them from frauds.

Figure 2:
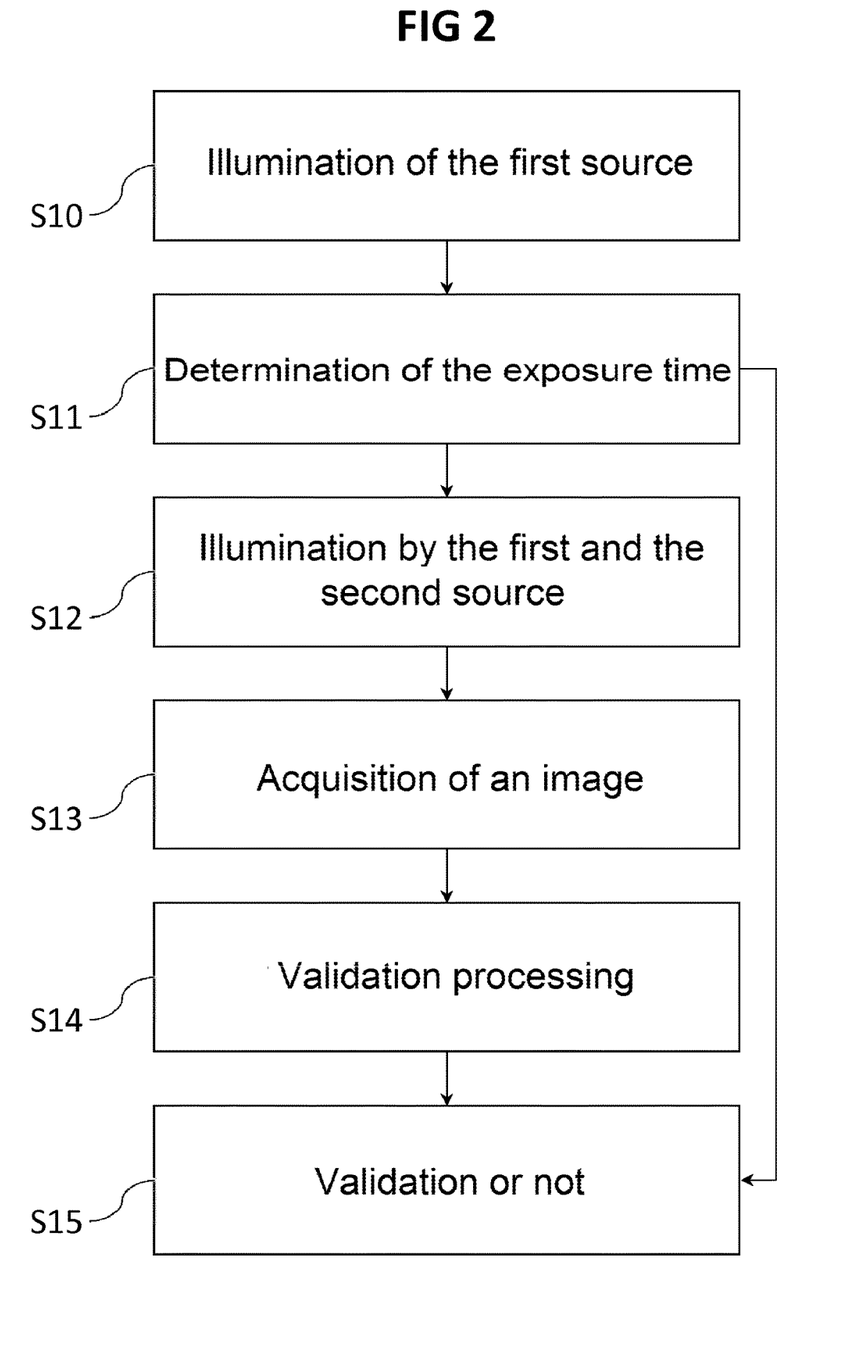
FIG. 2 is a schematic diagram illustrating steps of the validation method according to a possible embodiment of the invention.

In reference to FIG. 2, the validation method comprises a step S12 during which the object is illuminated by the first light source 1 and by the second light source 2 during an exposure time.

The exposure time is previously determined by a step S11 during which the finger is illuminated only by the first light source 1. The exposure time corresponds to the time necessary so that the average level of exposure to light of the image sensor reaches a predetermined value. For example, in the case of 8-bit values, the average predetermined value is an average greyscale of 128. As a function of people, diffusion of infrared light in the finger varies, especially as a function of the thickness of the skin and therefore the exposure time of the camera to infrared lighting varies also according to the fingers. This determination of the exposure time has the advantage of adapting the duration of later illumination to the thickness of the skin of the finger, so it is possible independently of the thickness of the fingers to reveal the venous network inside the finger, constituted by deoxygenated haemoglobin absorbing the infrared lighting used.

Also, this exposure time can be used to validate or not the authenticity of the finger, since a decoy generally needs an exposure time substantially different to that necessary for a human finger. An exposure time varying excessively from a range of acceptability signifies that the object presented is not an authentic finger.

Alternatively, the power of the first light source can be previously determined by a step during which the object 5 is illuminated only by the first light source 1 during an exposure time determined, said power corresponding to the power necessary so that the average level of exposure of the image sensor to light reaches a predetermined value. The validation processing can also be a function of the power of the first light source thus determined, similarly to the exposure time.

The respective light powers of illumination of the first light source 1 and of the second light source 2 are calibrated so that the first color component and the second color component are statistically balanced for an authentic element of the human body;

The image sensor 3 then acquires (step S13) an image of the illuminated object. This is a color image, the pixels of said image being associated with at least two characteristic values respectively of a first color component and a second color component, said second component corresponding to at least one wavelength of the second range of wavelengths. In the following example the first color component is red, while the second color component is green. As indicated previously, the components of a color image are typically red, green and blue, and the second component could also be blue.

Validation processing is conducted on this image (step S14). This validation processing is a function of comparisons between the values of the second component of the pixels of an area of interest of the image and the values of the first component of said pixels.

More precisely, the validation processing comprises calculation of a reflection parameter β which is a function of the sum of the values of the second component of the pixels of the area of interest whereof the first component is less by a predetermined value than the value of the second component. This sum is preferably weighted by the inverse of a predetermined weight, function of distribution of the light intensity of the second light source.

One possible formulation for the determination of the reflection parameter β is the following:

$$\beta = \frac{1}{N_{ROI}} \sum_{x \in ROI} \frac{x_g \cdot H(x_g - (x_r + \varepsilon))}{\omega_x}$$

with H the Heaviside function, $N_{ROI}$ the total number of pixels x of the area of interest ROI, $x_r$ the value of the first component of the pixel x, $x_g$ the value of the second component of the pixel x, ε a threshold constant, and $\omega_x$ the value of the predetermined weight linked to spatial distribution of the light intensity of the second light source 2 for the pixel x.

The threshold constant ε is selected so as to have a result less sensitive to noise, and is for example at least 5 in a range of values 0-255 (8-bit coding). In the example, the first color component is red, giving the index r, and the second component is green, giving the index g.

When the second component of a pixel, i.e. $x_g$, is not considered by the reflection parameter β, this signifies that the latter is not preponderant relative to its first component, i.e. $x_r$. Consequently this indicates that diffusion of the light coming from the first light source 1 is preponderant relative to the reflection of the light coming from the second light source 2. On the contrary, when the second component of a pixel, i.e. $x_g$, is considered by the reflection parameter β, this signifies that the latter is preponderant relative to its first component, i.e. $x_r$. Consequently this indicates that the reflection of light coming from the second light source 2 is preponderant relative to diffusion of the light coming from the first light source 1.

When the power of the second light source 2 is correctly calibrated relative to the power of the first light source 1, with an adequate exposure time, a real finger generally exhibits diffusion phenomenon of the light emitted by the first light source 1 which is preponderant, i.e., a low reflection parameter β. On the contrary, a decoy generally exhibits a reflection phenomenon of the light emitted by the second light source 2 which is preponderant, i.e., a high reflection parameter β.

Consequently, as a function of the value taken by the reflection parameter β, it is possible to validate or not the authenticity of the finger. For example, a threshold of acceptability can be determined for the reflection parameter β, for example from a learning base of true fingers and decoys, beyond which the finger is considered as not being authentic, and within which the finger is considered authentic.

This validation processing can also take into account the exposure time, as indicated previously, to validate authenticity or not. This then gives a consolidated measurement comprising the reflection parameter—exposure time couple, which better still discriminates decoys from real fingers.

The formula of the reflection parameter β shows weighting by the level of lighting of the pixel by the second component in the absence of the object. As indicated previously, this spatial distribution of the light intensity of the second light source 2 quantified in several levels of weight is predetermined. This is in fact a characteristic of the validation device used. Accordingly, the lighting of the object by the second light source is not uniform, and determination of the spatial distribution of the light intensity of the second light source 2 executes the corrective term $\omega_x$ to compensate this lack of homogeneity.

To determine this spatial distribution of the light intensity of the second light source 2, a white test pattern corresponding to white paper is placed on the surface of the support 7, and is illuminated by the second light source 2 alone. The image sensor 3 acquires an image of this illuminated test pattern, in a form representative of the intensity of the illumination by the second light source 2, such as for example an image in greyscale of the second color component, such as green.

This image is partitioned into several areas by thresholding of the greyscale, each of the areas being associated with a value taken by the pixels of said area. This value corresponds to the weight of the intensity of the lighting of the second light source in said area. But, it is preferable to have the ratios between the weights of the intensity of the lighting of the second light source of said areas which correspond to the ratios of the average intensities of the pixels in said areas. And this for remaining faithful to the spatial distribution of the light intensity of the second light source. For example, four areas can be defined, corresponding respectively to lighting weight areas of the second light source of value 100, 50, 25 and 12.

Figure 4:
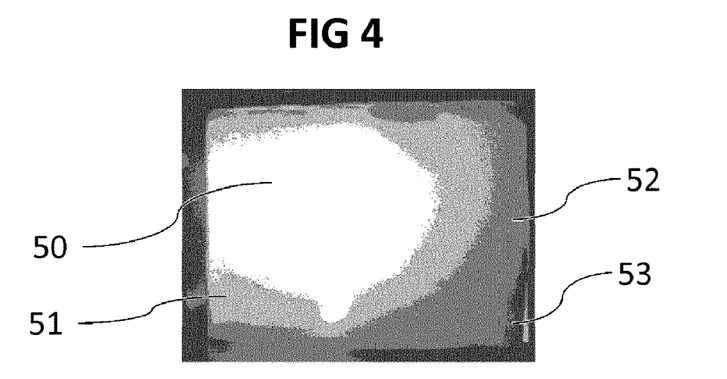
FIG. 4 is an example of spatial distribution of the light intensity of the second light source which has been quantified according to 4 levels of weight.

FIG. 4 illustrates an example of such an image, with
a first area 50 corresponding to the area where the intensity of the second lighting source is the greatest. In this way, all pixels x in said area will have a weight $\omega_x=100$, linked to the maximal intensity of the second lighting source.

a second area 51 corresponding to an area of less strong intensity (intensity reduced by a factor 2 relative to the area 50), for example. In this way all pixels x in said area will have a weight $\omega_x=50$.

a third area 52 corresponding to an area of weaker intensity (intensity reduced by a factor 2 relative to the area 51), for example. In this way, all pixels in said area will have a weight $\omega_x=25$.

a fourth area 53 corresponding to a lower area of intensity (intensity reduced by a factor of 2 relative to the area 52), for example. In this way, all pixels in said area will have a weight $\omega_x=12$.

Of course, the values given here are by way of indication, and depend on the device used. The partitioning must especially be determined as a function of the characteristics of the spatial distribution of the light intensity of the second light source 2. The term $\omega_x$ occurring in the calculation of the reflection parameter β described above takes the weight values: 100, 50, 25, 12 for example. Partitioning simplifies the calculations and above all avoids having measurements of very noisy reflection parameters, but it would also be possible to keep values of the distribution without partitioning.

The area of interest of the image corresponds to the area likely to contain information on the object analysed. In fact, the object is not represented in the entire image, and it is interesting to consider only part of the image, that where the object appears.

The area of interest is selected to correspond to the area of the image corresponding to the object to be validated as to whether it is an authentic element of the human body. The area of interest can for example be delimited by detecting the contour of the area of the image corresponding to the part of the object, especially by executing a classic algorithm for detection of contours such as the Canny or Deriche filter.

Figure 3:
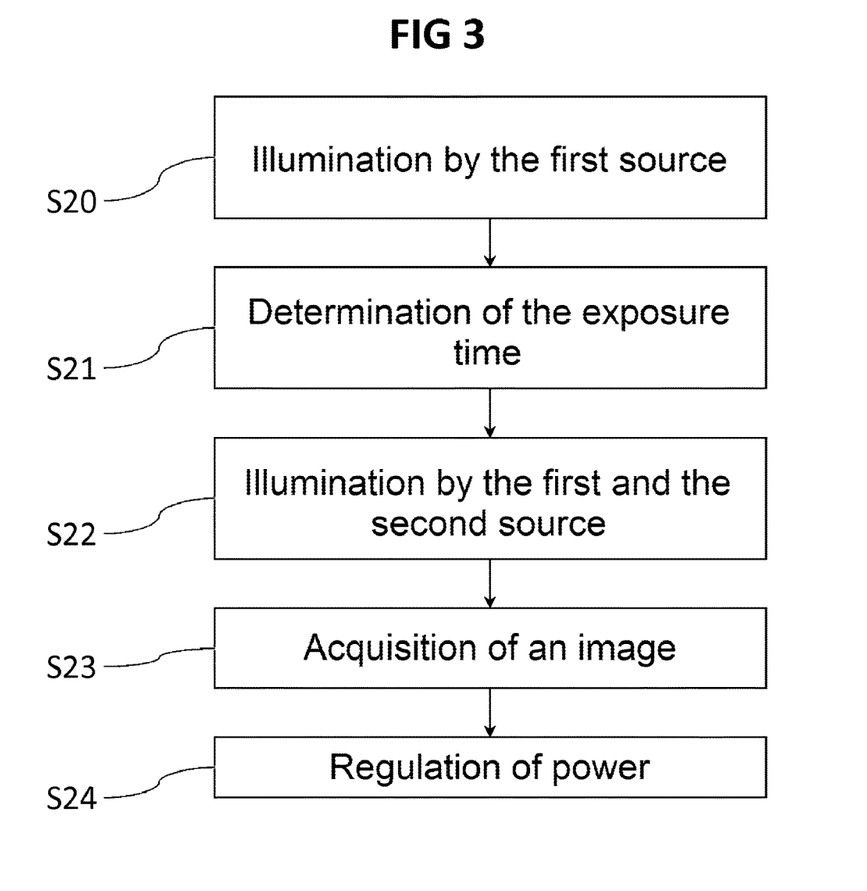
FIG. 3 is a schematic diagram illustrating steps of the calibration method according to a possible embodiment of the invention.

As pointed out earlier, the validation device must be calibrated when being put into service, especially where it relates to adjusting of the power of the second light source 2. It is possible to use parametering determined by calculation. But, to the extent where many parameters come into play, such as the position of the second light source 2, the wavelengths used or again the configuration of the support 7, it is preferable to execute a method for calibrating the validation device comprising at least the following steps, for each of the authentic elements of the human body of a learning base, in reference to FIG. 3:

illumination (step S20) of the authentic element of the human body by the first light source 1, determination of an exposure time (step S21) corresponding to the time necessary so that the average level of exposure to the light of the image sensor 3 reaches a predetermined value, the light power of the first light source 1 being selected to make appear the venous network inside the authentic element of the human body on an image acquired by the image sensor, iteratively until and as long as the difference between the first color component and the second color component in an area of interest of the image corresponding to the authentic element of the human body is less than an equilibrium threshold:

simultaneous illumination (step S22) of the element of the human body by the first light source 1 and by the second light source 2 during said exposure time, acquisition of an image (step S23) by the image sensor 3, increase (step S24) in the power of the second light source 2, the light power of the second light source being selected so as to be statically representative of the powers associated with each of the authentic elements of the human body of the learning base.

The appearance of the venous network corresponds especially to whether on the acquired image the largest subcutaneous blood vessels located at a depth of between 1 to 2 mm can be distinguished by way of a sufficiently pronounced contrast relative to their environment (a few points for 8-bit coding).

It should be noted that determination of the exposure time, done under lighting of the single first light source 1 as in the method explained earlier, dispenses with regulating the power of said first light source 1. Calibration of the power of the second light source 2 is done by learning on a population of representative authentic elements of the human body (living fingers in this case). The light power of the second light source is then selected so as to be statically representative of the powers associated with each of the authentic elements of the human body of the learning base. For example, a median power of the second light source 2 can be deduced therefrom and remains fixed.

The predominance of the reflection of light coming from the second light source 2 relative to the diffusion of light coming from the first light source 1, used in the validation processing of the presented object, depends inter alia on the quantity of light of the second light source 2 integrated by the image sensors during an exposure time whereof the regulation is presented above. Accordingly, if the illumination by the second light source 2 is too weak, the diffusion phenomenon will always be preponderant, and it will be difficult to distinguish a decoy.

As a consequence, the power of the second light source 2 is adjusted so as to attain a statistical equilibrium between the values of the second component of the pixels and the values of the first component of said pixels in the area of interest of the image, for an authentic element of the human body. The first color component and the second color component are statistically balanced for an authentic element of the human body when the difference between the first color component and the second color component in an area of an image corresponding to said authentic element of the human body is less than a threshold.

In the case of 8-bit images with coding from 0 to 255, this threshold can for example correspond to a difference of 10 between the first color component and the second color component, preferably of 5, and more preferably of 3.

The power of the second light source 2 used for the validation method is then determined from the adequate power recorded for each of the authentic elements of the human body of the learning base, so as to be statistically representative of the powers associated with each of the authentic elements of the human body of the learning base. For example, it can be the median power of them.

In the case of the use of two different second light sources 2, for example green (wavelength of between 500 and 550 nm) and blue (wavelength of between 435 and 500 nm), a reflection parameter is associated with each of the second light sources. Therefore there is for example a reflection parameter taking into account the values of the green component relative to the values of the first component and a reflection parameter taking into account the values of the blue component relative to the values of the first component.

In this way, two measurements are obtained and can be fused, with for example application of a threshold for the reflection parameter of the green light, application of a threshold for the reflection parameter of the blue light, then fusion of the resulting decisions, for example with a logical "AND" or a logical "OR". In the same way, calibration is done for each of said second light sources 2.

The invention is not limited to the embodiment described and illustrated in the appended figures. Modifications can be made, especially from the viewpoint of constituting various technical characteristics or by substitution of technical equivalents, without as such departing from the field of protection of the invention.

The invention claimed is:

1. A method for validation of whether an object is an element of the human body comprising at least the following steps:
    illumination, by at least one first light source emitting in the infrared and by at least one second light source emitting in the visible spectrum, of an object whereof the aim is to validate that said object corresponds to an element of the human body, said second light source emitting light at wavelengths inferior to those of the first source;
    acquisition of an image by an image sensor, the pixels of said image being associated with at least two characteristic values respectively of a first color component and of a second color component, said second component corresponding to at least one wavelength of the second source, the respective light powers of illumination of the first light source and of the second light source being previously calibrated so that the first color component and the second color component are statistically balanced for an authentic element of the human body, wherein the first color component and the second color component are statistically balanced for an authentic element of the human body when a difference between the first color component and the second color component in an area of an image corresponding to said authentic element of the human body is less than a threshold;
    execution of a validation processing as a function of comparisons between the values of the second component of the pixels of an area of interest of the image and the values of the first component of said pixels;
    validation or not of the authenticity of the object as a function of the result of the validation processing.

2. The method according to claim 1, wherein the first light source emits incident light to the object outside the field of acquisition of the image sensor, and the second light source emits incident light to the object in the field of acquisition of the image sensor.

3. The method according to claim 1, wherein a first polarizer is disposed on the light path between the first light source and the object, said first polarizer being a linear polarizer with a polarization axis in a first direction, and a second polarizer is disposed at the image sensor, said second polarizer being a linear polarizer with a polarization axis in a second direction orthogonal to the first direction, the first light source illuminating the object by polarized light in the first direction and the second light source illuminating the object by non-polarized light in the first direction.

4. The method according to claim 1, wherein the first light source emits in wavelengths between 780 nm and 900 nm, and the second light source emits in wavelengths between 435 nm and 550 nm.

5. The method according to claim 1, wherein the exposure time during which the object is illuminated is previously determined by a step during which the object is illuminated only by the first light source at a determined power, said exposure time corresponding to the time necessary so that the average level of exposure of the image sensor to light reaches a predetermined value.

6. The method according to claim 5, wherein the validation processing is also a function of the exposure time.

7. The method according to claim 1, wherein the power of the first light source is previously determined by a step during which the object is illuminated only by the first light source during a determined exposure time, said power corresponding to the power necessary so that the average level of exposure of the image sensor to light reaches a predetermined value.

8. The method according to claim 7, wherein the validation processing is also a function of the power of the first light source thus determined.

9. The method according to claim 1, wherein the validation processing comprises calculation of a reflection parameter which is a function of the sum of the values of the second component of the pixels of the area of interest whereof the first component is less by a predetermined value than the value of the second component.

10. The method according to claim 9, wherein said sum is weighted by the inverse of weights, functions of the predetermined spatial distribution of the light intensity of the second light source.

11. The method according to claim 10, wherein the reflection parameter $\beta$ is determined according to the following formula:

$$\beta = \frac{1}{N_{ROI}} \sum_{x \in ROI} \frac{x_g \cdot H(x_g - (x_r + \varepsilon))}{\omega_x}$$

with H the Heaviside function, $N_{ROI}$ the total number of pixels x of the area of interest ROI, $x_r$ the value of the first component of the pixel x, $x_g$ the value of the second component of the pixel x, $\varepsilon$ a threshold constant, and $\omega_x$ a predetermined weight, function of the light intensity of the second light source for the pixel x.

12. A non-transitory computer-readable non-volatile memory medium product storing program code instructions for executing the steps of the method according to claim 1 when said program is executed by a computer.

13. A validation device configured to execute a validation method according claim 1, said validation device comprising
    at least one first light source configured to emit light in the direction of the object;
    at least one second light source configured to emit light in the direction of the object at wavelengths inferior to those of the first source;
    an image sensor sensitive to a range of wavelengths covering at least partly the first range of wavelengths and the second range of wavelengths, configured to acquire an image of the object whereof the pixels are associated with at least two characteristic values respectively of a first color component and of a second color component, said second component corresponding to at least one wavelength of the second range of wavelengths,
    a processing unit comprising a computer with a processor and a memory, said processing unit configured to execute a validation processing as a function of comparisons between the values of the second component of the pixels and the values of the first component in an area of interest of the image and configured to validate or not of the authenticity of the object as a function of the result of the validation processing, wherein respective light powers of illumination of the first light source and of the second light source are calibrated so that the first color component and the second color component are statistically balanced for an authentic element of the human body, wherein the first color component and the second color component are statistically balanced for an authentic element of the human body when a difference between the first color component and the second color component in an area of an image corresponding to said authentic element of the human body is less than a threshold.

14. A method for calibrating a validation device according to claim 13, comprising at least the following steps, for each of the authentic elements of the human body of a learning base:

illumination of the authentic element of the human body by the first light source,     determination of an exposure time corresponding to the time necessary so that the average level of exposure to the light of the image sensor reaches a predetermined value, the light power of the first light source being selected to make appear the venous network inside the authentic element of the human body on an image acquired by the image sensor, iteratively until and as long as the difference between the first color component and the second color component in an area of interest of the image corresponding to the authentic element of the human body is less than an equilibrium threshold:

simultaneous illumination of the element of the human body by the first light source and by the second light source during said exposure time,     acquisition of an image by the image sensor,     acquisition of an image by the image sensor,     increase in the power of the second light source, the light power of the second light source being selected so as to be statically representative of the powers associated with each of the authentic elements of the human body of the learning base.

\* \* \* \* \*